United States Patent Office 3,514,309
Patented May 26, 1970

3,514,309
COATING PROCESS
Arthur Kong, Kearny, N.J., assignor to Celanese Corporation, New York, N.Y., a corporation of Delaware
No Drawing. Filed July 19, 1967, Ser. No. 654,390
Int. Cl. B44d 1/094
U.S. Cl. 117—21                                    10 Claims

ABSTRACT OF THE DISCLOSURE

Fluidized bed coating method for coating an article with a heat fusible resinous material, which includes providing a coating zone bounded by sidewalls and a floor containing heat fusible resin particles with the volume ratio of the resin particles to that of the coating zone being between 1:100 and about 1:1000. The resin particles may comprise an oxymethylene polymer.

---

The invention relates to the art of coating articles with a resinous coating. More particularly, the invention concerns an improved method for applying a uniform resinous coating to a bulky or comparatively large base article through a technique whereby pulverulent or particulate heat fusible polymer material is fused to the surface of the article.

During recent years considerable interest has been directed to the application of various polymeric coatings by the use of fluidized bed fusion techniques. A "fluidized bed" is commonly defined as being a mass of solid particles which exhibits the liquid-like characteristics of mobility, hydrostatic pressure, and an observable upper free surface or powdery zone across which a marked change in concentration of particles occurs. A fluidized bed may accordingly be termed "a dense phase" having an upper free surface. In general, a fluidized bed is formed by introducing an ascending current of gas into the particulate coating material under pressure with the bed being maintained in a fluidized state by controlling the flow of the gas. An article to be coated is heated and immersed at least partially into the fluidized bed of coating material. The fluidized bed coating technique is well known to those skilled in the art and is disclosed, for example, in U.S. Pat. Nos. 2,974,060 and 3,032,816. Also, commonly assigned Ser. Nos. 187,184, filed Apr. 13, 1962, and 450,498, filed Apr. 23, 1965, disclose novel fluidized bed processes for coating articles with an oxymethylene polymer.

It is generally recognized, however, that the fluidized bed coating technique possesses certain drawbacks particularly when one chooses to coat an article which is bulky or relatively large in comparison to the size of the available fluidized bed. In order to promote the formation of a uniform coating on an article present in a fluidized bed the distribution of gas through the dense phase of solid coating particles must be uniform. The presence of a large or bulky article in a fluidized bed tends, however, to interfere with the ascending flow of gas, thus causing inordinately large quantities of the particles to become fused in areas adjoining the article where the particle fluid movement is impaired. It is common knowledge that pockets of gas are frequently set up close to the bottom of a fluidized bed, which often result in geysering, channeling, or continuous chimneys of gas passing through the dense phase to produce irregular particle distribution. Also, in fluidized bed processes the ascending gas sometimes has a tendency to escape along the walls of the bed to the detriment of the remaining portion of the bed in contact with the article being coated.

It is an object of the present invention to provide an improved method for simultaneously coating all surfaces of an article with a heat fusible resinous material.

It is another object of the invention to provide an improved process for efficiently coating an article with an oxymethylene polymer which employs a powder fusion technique.

It is a further object of the invention to provide an improved process for coating a bulky or comparatively large article with a uniform resinous coating which employs an extremely low volume ratio of coating material to that of the coating zone.

These and other objects, as well as the scope, nature, and utilization of the invention will become apparent from the following detailed description and appended claims.

The drawing represents a perspective view partially cut away of an apparatus capable for use in carrying out the present method.

It has now been discovered that an improved method for coating an article with a heat fusible resinous material comprises providing a coating zone bounded by sidewalls and a floor containing a pulverulent heat fusible resinous material with the volume ratio of the pulverulent heat fusible resinous material to that of the coating zone being between about 1:100 and about 1:1000, heating at least a portion of an article above the melting point of the pulverulent heat fusible resinous material, contacting at least a portion of the heated article with the pulverulent heat fusible resinous material in the coating zone while turbulent movement is imparted to the pulverulent heat fusible resinous material by the introduction of a gas into the coating zone, and maintaining the article in the coating zone until a resinous coating is formed upon the article.

Any base article or work piece may be coated according to the present invention which is capable of being heated to a temperature above that of the melting point of the particular heat fusible resinous material selected without deleterious results. It is accordingly essential that the base article be capable of withstanding without appreciable deformation or degradation the heating described hereafter. For example, various metallic articles may be coated, such as those formed from iron, steel, aluminum, nickel, tin, or copper, as well as alloys of the same. Also, various non-metallic articles, such as those formed from ceramic materials, may be coated. Once coated according to the present invention the various articles may be used in environments which would otherwise be detrimental to the same if uncoated. The resinous coating may serve as an adherent relatively inert protective and/or decorative coating. For instance, metals when coated with suitable resinous coatings may be brought in contact with otherwise destructive solvents or chemicals without harm to the same. Polymer or resinous coatings may also serve as electrical insulation when fused to an electrically conductive article.

The heat fusible resinous coating material utilized in accordance with the present invention may be either thermoplastic or thermosetting. For example, suitable resins include oxymethylene polymers, various polyolefins such as polyethylene, epoxy resins, linear polyamides, polytetrafluoroethylene, those polymers derived from 3,3-bis(chloromethyl)oxethane and sold under the trade designation "Penton," and the like.

Oxymethylene polymers, having recurring —$OCH_2$— units directly attached to each other, have long been known and are the preferred heat fusible resinous coating materials for use in the present process. Such polymers may be prepared by the polymerization of formaldehyde or trioxane, which is a cyclic trimer of formaldehyde. In a particularly preferred embodiment of my invention, the polymeric compounds are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula:

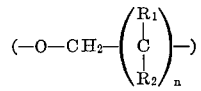

wherein n is an integer from zero to 5 and wherein n is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure.

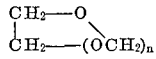

where *n* is an integer from zero to 2.

Examples of preferred polymers include copolymers of trioxane and cyclic ethers containing at least two adjacent carbon atoms, such as the copolymers disclosed in U.S. Pat. No. 3,027,352 to Walling et al. which patent is assigned to the same assignee as the subject application.

Among the specific cyclic ethers which may be used are ethylene oxide; 1,3-dioxolane; 1,3,5-trioxepane; 1,4-dioxane; trimethylene oxide; pentamethylene oxide; 1,2-propylene oxide; 1,2-butylene oxide; neopentyl formal; pentaerythritol diformal; paraldehyde; tetrahydrofuran and butadiene monoxide.

Other oxymethylene polymers and methods of preparation therefor are disclosed by Sittig in Hydrocarbon Processing and Petroleum Refiner, 41(11), pp. 131–170 (November 1962) and by Kern et al. in Angewandte Chemie 73(6), pp. 177–186 (Mar. 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride, and ethylenically unsaturated compounds such as styrene, vinyl methyl ketone and acrolein.

As used in the specification and claims of the instant application, the term "oxymethylene" includes substituted oxymethylene, where the substituents are inert with respect to the reactions in question, that is, the substituents are free of interfering functional groups and will not introduce undesirable reactions.

As used in the specification and claims, the term "copolymer" means polymers having two or more monomeric groups, including terpolymers and higher polymers. Suitable terpolymers include those disclosed in U.S. patent application Ser. No. 229,715, filed Oct. 10, 1962, in the names of W. E. Heinz and F. B. McAndrew, which is also commonly assigned.

Oxymethylene polymers, suitable for use in this invention, also include oxymethylene homopolymers, such as those made from trioxane or formaldehyde. In certain instances it may be desirable to "end-cap" the polymer molecules by such methods as esterification in order to increase their thermal stability.

The preferred coating polymers according to the invention have an inherent viscosity of at least one, when measured at 60° C. and an 0.1 weight percent solution in p-chlorophenol containing 2 weight percent of α-pinene.

The preferred polymers which are used as coating materials in accordance with this invention are thermoplastic materials having a melting point of at least 150° C. and are normally millable at a temperature of about 200° C. They have an average molecular weight of at least 10,000. These polymers have a high thermal stability before the treatment disclosed herein. However, this stability is markedly improved by such treatment. For example, if an oxymethylene polymer, which is chemically stabilized as described below, is placed in an open vessel in a circulating air oven at a temperature of about 230° C., and its weight loss is measured without removal of the sample from the oven, it will have a thermal degradation rate of less than 1.0 weight percent/minute for the first 45 minutes and, in preferred instances, less than 0.1 weight percent/minute for the same period of time.

In a preferred embodiment of this invention it is generally desirable to incorporate one or more thermal stabilizers into the copolymer in order to bring its thermal degradation rate even lower. The proportion of stabilizer incorporated depends upon the specific stabilizer used. A proportion between about 0.05 and 10 weight percent, based on the weight of the polymer, has been found suitable for most stabilizers.

One suitable stabilizer system is a combination of (1) an antioxidant ingredient, such as phenolic antioxidant and most suitably a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis(4-methyl-6-tertiary butyl phenol) and 4,4' - butylidene bis(6 - tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, melamine, cyanoguanidine, compounds having tertiary amine and terminal amide groups, compounds having amidine groups, cycloaliphatic amine compounds, and aliphatic acylureas.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, when in finely divided dry state, may be blended into finely divided polymer in any suitable blending apparatus.

One suitable method of incorporation of the chemical stabilizers is by blending a dry solid stabilizer into the plastic polymer, while the latter is being kneaded on heated rolls or through an extruder.

Any suitable catalyst for the polymerization of trioxane or formaldehyde alone or with other materials may be used to provide the oxymethylene polymers which are utilized in accordance with the invention. The particularly preferred catalysts are boron fluoride and boron fluoride-containing materials, such as boron fluoride monohydrate, boron fluoride dihydrate and boron fluoride trihydrate, as well as boron fluoride coordinate complexes.

Prior to coating articles with a heat fusible polymer in accordance with the present invention, it is recommended for best results that the surface be essentially free of foreign matter, such as oil, grease or dirt. Standard procedures may be utilized to remove adhering foreign matter, such as degreasing or alkaline cleansing techniques. Surface roughening by abrasion or etching may improve the degree of adhesion between the article and the polymer coating in some instances. Also, it may be desirable to surface modify the article prior to coating by the application of a suitable primer coating. Commonly assigned Ser. Nos. 386,398, filed July 30, 1964, and 436,665, filed Mar. 2, 1965 disclose novel methods for accomplishing an improved bond between a base article and an oxymethylene polymer using priming techniques.

It is essential that the heat fusible resinous coating material selected for use in the present process be in pulverulent or particulate form. Finely divided resinous particles in a variety of configurations may be utilized. For instance, the finely divided particles may be in the form of an amorphous powder, granules, pellets, flakes, spheres, etc. The pulverulent heat fusible resinous material is suitably ground to a particle size predominantly between about 40 to 325 mesh (420 to 44 microns) prior to use in a preferred embodiment of the invention, and between 80 and 200 mesh (177 to 74 microns) in a particularly preferred embodiment.

The heat fusible resinous material selected for use in accordance with the present invention is initially present in the coating zone (described hereafter) in a volume ratio between about 1:100 and about 1:1000, and preferably in a volume ratio of about 1:500. As the pulverulent resinous material is consumed by becoming fused to the surface of the article being coated, an additional quantity of the material may be continuously or intermittently added to the coating zone or "powder chamber" to replenish the supply of available coating material, and to maintain the same within the above-identified volume ratio range. If the volume ratio of resinous material to that of the coating zone much exceeds 1:100 then the desired degree of agitation or turbulence which is capable of efficiently yielding a uniform coating upon the article is impaired. Also, if the volume ratio of resinous material to that of the coating zone is much less than 1:1000 then the quantity of coating material deposited upon the article may be extremely thin or incomplete and/or require an inordinately extended deposition period. Commonly the complete coating of an article according to the present invention may be accomplished within 30 seconds to 5 minutes depending upon the size and configuration of the article, size and configuration of the coating zone, and the ultimate thickness of the coating desired. It will be readily apparent that the volume ratio of heat fusible resinous material to that of the coating zone, utilized in the present process, is many times lesser than the volume ratio of solid material utilized in a fluidized bed coating process, and that the instant improved coating process should be considered entirely distinct from such a "dense phase" process.

The coating zone utilized in carrying out the present process may be formed by an enclosure having sidewalls and a floor. Within the sidewalls and floor perforations or jets are suitably situated through which a gas may be introduced. The floor of the enclosure is preferably formed, however, from a porous material through which gas may also be introduced. The pores present in such porous material may be sufficiently small to retain and to prevent the loss of pulverulent coating material when the zone is not in operation. It is also possible to provide perforations or jets in a lid for the coating zone through which a gas may be introduced. If a lid is utilized, it is provided with an aperture of sufficient size to enable introduction of the article to be coated into the coating zone. The general configuration of the coating zone may be varied. For instance, the zone may be cubical, cylindrical, or even spherical.

The article to be coated is preferably suspended within the coating zone by any suitable suspending means while at a temperature above the melting point of the pulverulent coating material. For instance, a metallic wire or a filament capable of withstanding the elevated temperature used in the process may be secured to the article and serve as the suspending means. In a preferred embodiment of the invention the article is heated outside the coating zone such as in an electric oven, and then lowered into the coating zone and maintained there until a resinous coating is formed upon the article. Commonly a uniform coating thickness of about 10-20 mils may be deposited upon the article during a single expose of the article to the particulate coating material which is in turbulent movement. If a coating of a greater thickness is desired the temperature of the article may be raised a plurality of times above the melting point of the coating material and the article successively introduced into the coating zone or "powder chamber." For best results it is recommended that the article be heated to a temperature of at least about 25° C. to 100° C. in excess of the melting point of heat fusible resinous coating material. When an oxymethylene polymer is utilized as the coating material at least a portion of the article is commonly heated to a temperature between about 175° C. and about 260° C. in the instant process.

Turbulent movement is imparted to the pulverulent resinous material within the coating zone by the introduction into the coating zone of a gas from a plurality of locations about the periphery of the zone. The exact number of locations from which the gas is introduced into the coating zone may be varied so long as a random, chaotic agitation of the coating particles is produced. The gas is suitably stored under pressure and is released so as to promote agitation. The quantity and velocity of gas allowed to flow into the coating zone is adjusted so as to promote a relatively even flow distribution of agitated particles throughout the coating zone without undue loss of particles through the top of zone. The introduction of gas through the sidewalls of the coating zone is particularly effective for promoting the desired degree of agitation. In a preferred embodiment of the invention air serves as the gas used to promote turbulent particle movement within the coating zone and is selected primarily on the basis of economic considerations. Other gases may, however, be satisfactorily utilized which do not produce undesirable side effects. Illustrative examples of such additional gases include oxygen, carbon dioxide, and nirtogen. The turbulent particle movement present in the coating zone is capable of imparting a relatively uniform resinous coating even though the article be comparatively large in comparison to the size of the coating zone.

After a coating of the desired thickness is obtained upon an article, it may be desirable in some instances to remove the coated article from the coating zone, and again to heat the article to assist in the formation of a surface coating of improved smoothness. Such a postheating insures that any particles which may adhere to the surface of the coating are fused which enhances the gloss and reduces the porosity of the coating.

The following example is given as a specific illustration of the invention. It should be understood, however, that the invention is not limited to the specific details set forth in the example.

EXAMPLE

An oxymethylene polymer is selected which has been prepared by polymerizing trioxane and ethylene oxide, which polymer contains approximately 2 weight percent of randomly distributed oxyethylene groups in the oxymethylene chains. The polymer has been stabilized by hydrolytic degradation of the unstable polymer ends as disclosed in commonly assigned Ser. No. 102,097, filed Apr. 11, 1961, by Frank M. Berardinelli, and by the incorporation of a scission inhibitor combination comprising about 0.08 percent cyanoguanidine, and about 0.02 percent melamnie; and 0.5 percent of the phenolic stabilizer, 2,2'-methylene-bis (4-methyl-6-tertiary butyl phenol). The oxymethylene polymer has a particle size of about 80 mesh (177 microns) and a crystalline melting point of 195° C.

To the generally cubical coating zone or powder chamber 1 of the apparatus shown in the drawing is added the pulverulent oxymethylene polymer so that 1/500 of the volume of the powder chamber 1 is occupied by the particulate coating material. The particulate material is first introduced into hopper 2, and allowed to flow into powder chamber 1, through conduit 4 by the actuation of star valve 6. The powder chamber 1 is formed by sidewalls 8, 10, 12 (the fourth sidewall is not shown in the drawing), porous plate 14, and roof 16. A plurality of perforations 18, 20, 22, 24 are provided about the periphery of powder chamber 1.

Outer walls 26 and 28, a forward and a rear outer wall (not shown), outer roof 30, and outer floor 32, are in a spaced relationship to the periphery of powder chamber 1. Powder chamber 1 is upheld by supports 34 and 36 secured to outer floor 32. An aperture 38 is provided in outer roof 30 which communicates with powder chamber 1 through cylindrical collar 40. Conduit 42 is attached to a controlled source (not shown) of dried, dirt and oil free compressed air and communicates with the cavity 44 present between porous plate 14 and outer floor 32.

Compressed air at room temperature under 25 p.s.i.g. pressure is introduced into conduit 42, and turbulent movement is imparted to the particulate oxymethylene polymer (not shown) in powder chamber 1. A torus 46 formed from steel and having an outer diameter of 5 inches and an inner diameter of 4 inches is heated to a uniform temperature of 230° C. in a circulating air electric oven (not shown) and is introduced through aperture 38 into powder chamber 1 while suspended by wire 48. After the passage of one minute the torus is coated with a uniform protective polymer coating of 15 mils thickness and is removed from powder chamber 1.

The embodiments of the invention in which an exclusive property or privilege is claimed are defined as follows:

I claim:

1. A method of coating an article with a heat fusible resinous material which comprises providing a coating zone bounded by sidewalls and a floor containing a pulverulent heat fusible resinous material with the volume ratio of said pulverulent heat fusible resinous material to that of said coating zone being between about 1:100 and 1:1000, heating at least a portion of an article above the melting point of said pulverulent heat fusible resinous material, contacting at least a portion of said heated article with said pulverulent heat fusible resinous material in said coating zone while turbulent movement is imparted to said pulverulent heat fusible resinous material by the introduction of a gas into said coating zone, and maintaining said article in said coating zone until a resinous coating is formed upon said article.

2. A method of coating an article according to claim 1 in which turbulent movement is imparted to said pulverulent heat fusible resinous material by the introduction of a gas into said coating zone through the sidewalls thereof.

3. A method of coating an article according to claim 1 in which turbulent movement is imparted to said pulverulent heat fusible resinous material by the introduction of a gas into said coating zone through the sidewalls and floor thereof.

4. A method of coating an article with an oxymethylene polymer comprising providing a coating zone bounded by sidewalls and a floor containing pulverulent oxymethylene polymer with the volume ratio of said pulverulent oxymethylene polymer to that of said coating zone being between about 1:100 and 1:1000, heating at least a portion of an article above the melting point of said pulverulent oxymethylene polymer, contacting at least a portion of said heated article with said pulverulent oxymethylene polymer in said coating zone while turbulent movement is imparted to said pulverulent oxymethylene polymer by introduction of a gas into said coating zone, and maintaining said article in said coating zone until an oxymethylene polymer coating is formed upon said article.

5. A method of coating an article according to claim 4 in which the oxymethylene polymer is a copolymer having a melting point above about 150° C. with the copolymer having at least one chain containing recurring oxymethylene units interspersed with —OR— groups in the main polylmer chain, where R is a divalent radical containing at least two carbon atoms directly linked to each other and positioned in the chain between the two valences, with any substituents on said R radical being inert.

6. A method of coating an article according to claim 4 in which said pulverulent oxymethylene polymer is predominantly between about 40 to 325 mesh.

7. A method of coating an article according to claim 4 in which at least a portion of said article is heated to a temperature between about 175° C. and about 260° C.

8. A method of coating an article according to claim 4 in which turbulent movement is imparted to said pulverulent oxymethylene polymer by the introduction of a gas into said coating zone through the sidewalls thereof.

9. A method of coating an article according to claim 4 in which turbulent movement is imparted to said particulate oxymethylene polymer by the introduction of a gas into said coating zone through the sidewalls and floor thereof.

10. A method of coating an article with an oxymethylene copolymer having a melting point above about 150° C., with the copolymer having at least one chain containing recurring oxymethylene units interspersed with —OR— groups in the main polymer chain where R is a divalent radical containing at least two carbon atoms directly linked to each other and positioned in the chain between the two valences with any substituents on said R radical being inert, which comprises providing a coating zone bounded by sidewalls and a floor and continuing said oxymethylene copolymer in particulate form in a volume ratio to that of said zone between about 1:100 and 1:1000, with said particles being predominantly between about 40 mesh and about 325, heating at least a portion of said article above the melting point of said particulate oxymethylene copolymer, contacting at least a portion of said heated article with said particulate oxymethylene copolymer in said coating zone while turbulent movement is imparted to said particulate oxymethylene copolymer by introduction of a gas into said coating zone through the sidewalls and floor thereof, and maintaining said article in said coating zone until an oxymethylene copolymer coating is formed upon said article.

References Cited

UNITED STATES PATENTS

| | | |
|---|---|---|
| 2,775,570 | 12/1956 | Parkdoll et al. |
| 2,844,489 | 7/1958 | Gemmer _____ 171—21 X |
| 3,027,352 | 3/1962 | Walling et al. |

MURRAY KATZ, Primary Examiner

P. ATTAGUILE, Assistant Examiner

U.S. Cl. X.R.

118—429; 260—47

UNITED STATES PATENT OFFICE
CERTIFICATE OF CORRECTION

Patent No. 3,514,309         Dated May 26, 1970

Inventor(s) Arthur Kong

It is certified that error appears in the above-identified patent and that said Letters Patent are hereby corrected as shown below:

Please correct the errors on page 1, column 1, line 25 from the word "polymer" to polymeric. Also correct on page 3, column 5, line 58 the word " proces" to process (with 2 s's). Also on page 4, column 8, line 46 the word "continuing" to the word "containing".

SIGNED AND
SEALED
SEP 15 1970

(SEAL)
Attest:

Edward M. Fletcher, Jr.
Attesting Officer

WILLIAM E. SCHUYLER, JR.
Commissioner of Patents